(12) United States Patent
Jiang et al.

(10) Patent No.: US 12,538,497 B2
(45) Date of Patent: Jan. 27, 2026

(54) LLC CHIP, CACHE SYSTEM AND METHOD FOR READING AND WRITING LLC CHIP

(71) Applicant: XI'AN UNIIC SEMICONDUCTORS CO., LTD., Xi'an (CN)

(72) Inventors: Xiping Jiang, Xi'an (CN); Xiaofeng Zhou, Xi'an (CN)

(73) Assignee: XI'AN UNIIC SEMICONDUCTORS CO., LTD., Xi'an (CN)

( * ) Notice: Subject to any disclaimer, the term of this patent is extended or adjusted under 35 U.S.C. 154(b) by 137 days.

(21) Appl. No.: 18/526,281

(22) Filed: Dec. 1, 2023

(65) Prior Publication Data

US 2024/0099034 A1  Mar. 21, 2024

Related U.S. Application Data

(63) Continuation of application No. PCT/CN2022/113704, filed on Aug. 19, 2022.

(30) Foreign Application Priority Data

Sep. 2, 2021 (CN) .......................... 202111027040.1

(51) Int. Cl.
  *G11C 7/00* (2006.01)
  *G11C 11/4096* (2006.01)
  (Continued)

(52) U.S. Cl.
  CPC .......... *H10B 80/00* (2023.02); *G11C 11/4096* (2013.01); *H01L 25/0657* (2013.01); *H01L 25/18* (2013.01); *H01L 2225/06513* (2013.01)

(58) Field of Classification Search
  CPC . H10B 80/00; G11C 11/4096; H01L 25/0657; H01L 25/18; H01L 2225/06513
  (Continued)

(56) References Cited

U.S. PATENT DOCUMENTS

| 7,736,949 B2 * | 6/2010 | Chen ..................... H01L 23/481 438/106 |
| 11,403,097 B2 * | 8/2022 | Ould-Ahmed-Vall ...................... G06F 9/30101 |

(Continued)

FOREIGN PATENT DOCUMENTS

| CN | 101131858 A | 2/2008 |
| CN | 102184365 A | 9/2011 |

(Continued)

OTHER PUBLICATIONS

International Search Report, International Application No. PCT/CN2022/113704, mailed Nov. 1, 2022 (17 pages).

(Continued)

*Primary Examiner* — Viet Q Nguyen

(57) ABSTRACT

An LLC chip and a cache system are provided. The LLC chip includes a storage wafer, an interface logic unit and a packaging substrate. The interface logic unit and the storage wafer are arranged in sequence on the packaging substrate. A plurality of processing assemblies is connected to the interface logic unit so as to perform read and write operations on the storage wafer through the interface logic unit. The storage wafer includes at least one storage space. The plurality of processing assemblies performs read and write operations on a specific storage space or any storage space so as to achieve non-shared independent storage access or shared storage access. Signal transmission bandwidth is thus improved by means of the plurality of distributed interfaces, and data is cached by means of a non-shared mode or shared mode so as to increase data accessing efficiency of the processing assemblies.

17 Claims, 7 Drawing Sheets

(51) Int. Cl.
*H01L 25/065* (2023.01)
*H01L 25/18* (2023.01)
*H10B 80/00* (2023.01)

(58) Field of Classification Search
USPC .................................................. 365/189.011
See application file for complete search history.

(56) References Cited

U.S. PATENT DOCUMENTS

| | | | |
|---|---|---|---|
| 11,556,476 B2* | 1/2023 | Chang | G06F 12/0875 |
| 11,650,819 B2* | 5/2023 | Elmalaki | G06F 9/3001 |
| | | | 712/222 |
| 11,681,451 B2* | 6/2023 | Gu | G06F 3/064 |
| | | | 706/15 |
| 11,893,239 B2* | 2/2024 | Malladi | G06F 13/4243 |
| 11,934,826 B2* | 3/2024 | Norrie | G06F 7/5443 |
| 12,242,381 B2* | 3/2025 | Sity | G06F 3/0673 |
| 2010/0250848 A1 | 9/2010 | Kim | |
| 2019/0286566 A1* | 9/2019 | Lee | G11C 8/12 |
| 2020/0006423 A1* | 1/2020 | Lin | H10N 50/01 |
| 2020/0303363 A1* | 9/2020 | Yoo | H01L 23/147 |
| 2020/0411479 A1* | 12/2020 | Zhang | H01L 24/13 |
| 2024/0241333 A1* | 7/2024 | Pezeshki | G02B 6/43 |

FOREIGN PATENT DOCUMENTS

| | | |
|---|---|---|
| CN | 108417235 A | 8/2018 |
| CN | 112558889 A | 3/2021 |
| CN | 113223973 A | 8/2021 |
| CN | 113643739 A | 11/2021 |
| CN | 216119560 U | 3/2022 |

OTHER PUBLICATIONS

Chinese First Office Action, Chinese Application No. 202111027040. 1, mailed Aug. 29, 2024 (11 pages).

* cited by examiner

LLC CHIP, CACHE SYSTEM AND METHOD FOR READING AND WRITING LLC CHIP

CROSS REFERENCE

The present disclosure is a continuation-application of International Patent Application No. PCT/CN2022/113704, filed on Aug. 19, 2022, which claims priority to Chinese Patent Application No. 202111027040.1 filed on Sep. 2, 2021 and entitled "LLC CHIP, CACHE SYSTEM AND METHOD FOR READING AND WRITING LLC CHIP", both of which are herein incorporated by reference in their entireties.

TECHNICAL FIELD

The embodiments of the present disclosure relate to the field of data cache, in particular to an LLC chip, a cache system and a method for reading and writing the LLC chip.

BACKGROUND

In the related art, in order to realize LLC (last-level cache) by a CPU (central processing unit), a NoC (network-on-chip) is added between MLC (mid-level cache) and LLC of the CPU to increase a bandwidth of the CPU for LLC access. The LLC uses a MRAM (magnetic random-access memory) module for data caching, but the MRAM is a medium memory with a small capacity.

SUMMARY

A first aspect of the present disclosure provides an LLC chip. The LLC chip includes a storage wafer, an interface logic unit, and a packaging substrate. The interface logic unit and the storage wafer are sequentially arranged on the packaging substrate. The storage wafer and the interface logic unit are three-dimensionally integrated and arranged on the packaging substrate to form the LLC chip. A plurality of processing assemblies is connected to the interface logic unit, so as to perform read and write operations on the storage wafer through the interface logic unit.

A second aspect of the present disclosure provides a cache system. The cache system includes an LLC chip and processing assemblies. Each of the processing assemblies includes at least two CPUs, at least two L1 level caches and one L2 level cache. The plurality of processing assemblies is connected to the LLC chip to perform read and write operations. The LLC chip includes a storage wafer, an interface logic unit and a packaging substrate. The interface logic unit and the storage wafer are sequentially arranged on the packaging substrate. The storage wafer and the interface logic unit are three-dimensionally integrated and arranged on the packaging substrate to form the LLC chip. The plurality of processing assemblies is connected to the interface logic unit, to perform read and write operations on the storage wafer through the interface logic. The storage wafer includes at least one storage space, and the plurality of processing assemblies perform read and write operations on a specific storage space or any storage space, so as to realize non-shared independent storage access or shared storage access. The storage space of the storage wafer is divided according to an access volume or an access speed of the plurality of processing assemblies.

A third aspect of the present disclosure provides a method for reading and writing an LLC chip. The method includes receiving input information from a CPU; driving a corresponding controller according to the input information; and accessing a DRAM array to perform read and write operations.

BRIEF DESCRIPTION OF THE DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings may also be obtained based on these drawings without creative effort.

DETAILED DESCRIPTION

In order to enable those skilled in the art to better understand the technical solution of the present disclosure, an LLC chip and a cache system provided by the present disclosure will be further described in detail below in conjunction with the drawings and specific implementation methods. It should be understood that the described embodiments are only some of the embodiments of the present disclosure, rather than all the embodiments. Based on the embodiments in the present disclosure, all other embodiments obtained by persons of ordinary skill in the art without making creative efforts belong to the scope of protection of the present disclosure.

The terms "first", "second", etc. in the present disclosure are configured to distinguish different objects, not to describe a specific order. Furthermore, the terms "including" and "having", as well as any variations thereof, are intended to cover a non-exclusive inclusion. For example, a process, a method, a system, a product or a device including a series of Operations or units is not limited to the listed Operations or units, but optionally also includes unlisted Operations or units, or optionally further includes other Operations or units inherent in these processes, methods, products or devices.

In the related art, ways of caching data of a CPU include FLC (first-level cache), MLC (mid-level cache) and LLC (last-level cache), corresponding to L1 level cache, L2 level cache and L3 level cache respectively. Compared to the L1 level cache and the L2 level cache, the L3 level cache has advantages of higher frequency and lower latency for data access.

In order to realize the LLC, in the related art, a NoC is added between the MLC and the LLC of the CPU to increase a bandwidth of the CPU for access of the LLC. At the same time, the LLC uses a MRAM memory module for data caching, but the MRAM memory is a medium memory with a small capacity.

Therefore, the present disclosure provides an LLC chip for implementing an LLC with a large-capacity and high-bandwidth.

Figure 1:
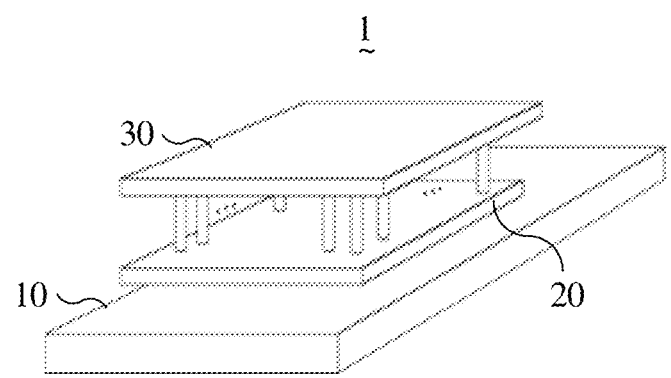
FIG. 1 is a first structural schematic view of an LLC chip according to an embodiment of the present disclosure.
Figure 2:
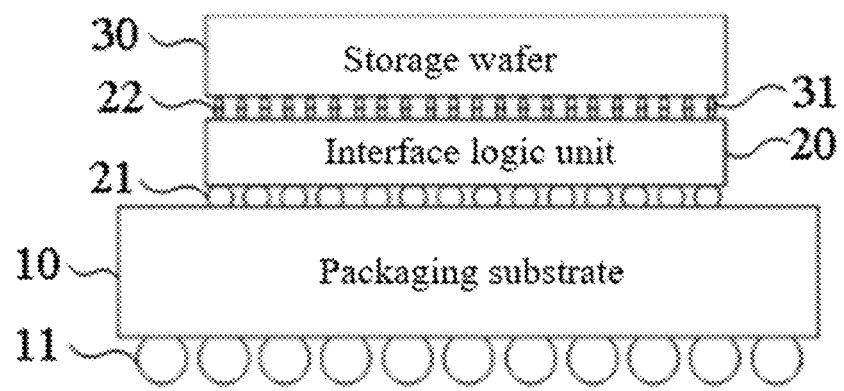
FIG. 2 is a second structural schematic view of the LLC chip according to an embodiment of the present disclosure.

FIG. 1 is a first structural schematic view of an LLC chip according to an embodiment of the present disclosure, and FIG. 2 is a second structural schematic view of an LLC chip according to another embodiment of the present disclosure. As shown in FIG. 1, the LLC chip 1 includes a packaging substrate 10, an interface logic unit 20 and a storage wafer 30. The interface logic unit 20 and the storage wafer 30 are sequentially arranged on the packaging substrate 10, and the storage wafer 30 and the interface logic unit 20 are three-dimensionally integrated and arranged on the packaging substrate 10 to form the LLC chip 1.

The packaging substrate 10 is connected to the interface logic unit 20, and the interface logic unit 20 is further connected to the storage wafer 30.

A CPU is interconnected with the LLC chip 1 through the packaging substrate 10 of the LLC chip. Specifically, the CPU and the LLC chip are interconnected through an additional packaging substrate and/or through a circuit board; or the CPU is assembled on the packaging substrate of the LLC chip and interconnected with the LLC chip. In the following content, that the CPU and the LLC chip are interconnected through the additional packaging substrate and/or the circuit board is taken as an example.

As shown in FIG. 2, the storage wafer 30 includes a plurality of first bonding columns 31, the interface logic unit 20 includes a plurality of second bonding columns 22 and a plurality of bumps 21, and the packaging substrate 10 includes a plurality of lead ports 11.

The plurality of first bonding columns 31 are arranged corresponding to the plurality of second bonding columns 22, and each first bonding column 31 is connected to each corresponding second bonding column 22, such that the storage wafer 30 is connected to the interface logic unit 20. The interface logic unit 20 is connected to the packaging substrate 10 through the plurality of bumps 21, and the packaging substrate 10 is connected to the CPU through the plurality of lead ports 11.

When the CPU outputs reading and writing commands to the LLC chip 1, the storage wafer 30 is connected to the CPU through the interface logic unit 20 and the packaging substrate 10 in sequence, such that the CPU performs read and write operations on the storage wafer 30.

In the present embodiment, the LLC chip 1 is three-dimensionally integrated with the storage wafer 30 and the interface logic unit 20, and the storage wafer 30 and the interface logic unit 20 are connected by setting the plurality of first bonding columns 31 and the plurality of second bonding columns 22 correspondingly, improving signal transmission bandwidth through the plurality of distributed interfaces.

Optionally, in the present embodiment, bonding between the first bonding column 31 and the second bonding column 22 is one way to realize the connection between the storage wafer 30 and the interface logic unit 20. In other embodiments, the storage wafer 30 and the interface logic unit 20 may also be connected through TSV (through silicon via), RDL (re distribution layer) or Bump.

Figure 3:
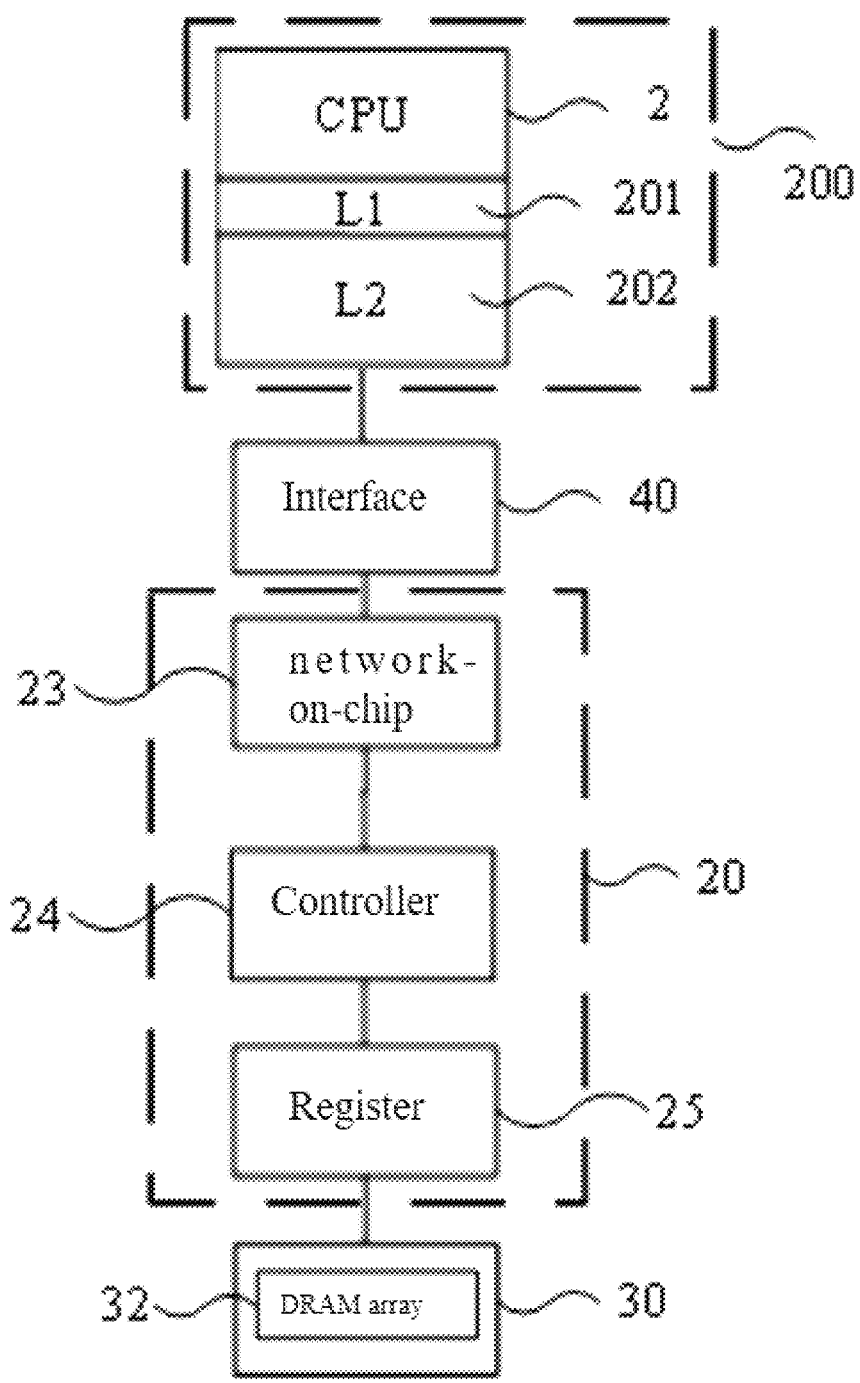
FIG. 3 is a structural schematic view of an interface logic unit according to an embodiment shown in FIG. 1.

In combination with FIG. 1 and FIG. 2, as shown in FIG. 3, which is a structural schematic view of an interface logic unit according to an embodiment as shown in FIG. 1. As shown in FIG. 3, the interface logic unit 20 includes a network-on-chip 23, a controller 24 and a register 25.

The CPU 2 is connected to the interface logic unit 20 through an interface 40. The CPU 2 is integrated with an L1 level cache 201 and an L2 level cache 202 to form a processing assembly 200, and the processing assembly 200 is further connected to the LLC chip 1 through the interface 40, that is, connected to the L3 level cache. In another embodiment, the integrated L2 level cache 202 in the CPU 2 may be omitted.

Optionally, the interface 40 may be an existing LLC logical interface. Specifically, in the present embodiment, the interface 40 may be composed of a plurality of bumps 21 of the interface logic unit 20, the packaging substrate 10, and a plurality of lead ports 11 of the packaging substrate 10.

One end of the network-on-chip 23 is connected to the interface 40, another end of the network-on-chip 23 is connected to one end of the controller 24, another end of the controller 24 is connected to one end of the register 25, and another end of the register 25 is connected to the storage wafer 30.

The interface 40 is configured to connect the CPU 2 and the network on chip 23, such that the interface logic unit 20 searches for a node corresponding to the network on chip 23 according to input information of the CPU 2, and then drives the controller 24 corresponding to the node. The controller 24 is configured to access the storage wafer 30, and the register 25 is configured for data cache.

Specifically, the register 25 is connected to the storage wafer 30 through a plurality of ports for data buffering.

When the CPU 2 of the processing assembly 200 outputs reading and writing instructions to the LLC chip 1, the CPU 2 performs read and write operations on the store Wafer 30 through the L1 level cache 201, the L2 level cache 202, the interface 40, the network on chip 23, the controller 24 and the register 25 sequentially. In one embodiment, the read and write operations conform to a cache coherence protocol, such as a MESI protocol.

In the present embodiment, the storage wafer 30 is a DRAM (dynamic random-access memory) wafer, the DRAM wafer includes at least one DRAM array 32, and the interface logic unit 20 is connected to the at least one DRAM array 32, to enable the CPU 2 to perform read and write operations.

The DRAM is a volatile memory, which is different from a non-volatile memory in that the DRAM is able to perform data access faster and has lower data access delay.

In the present embodiment, the LLC chip 1 uses the volatile memory DRAM wafer as the storage wafer 30 to increase data access speed and further increase the speed of the CPU 2 to perform read and write operations on the LLC chip 1. At the same time, the LLC chip 1 of the present embodiment is provided with the register 25 connected to the storage wafer 30 and the controller 24, so as to reduce performance loss caused by frequent data switching.

Figure 4:
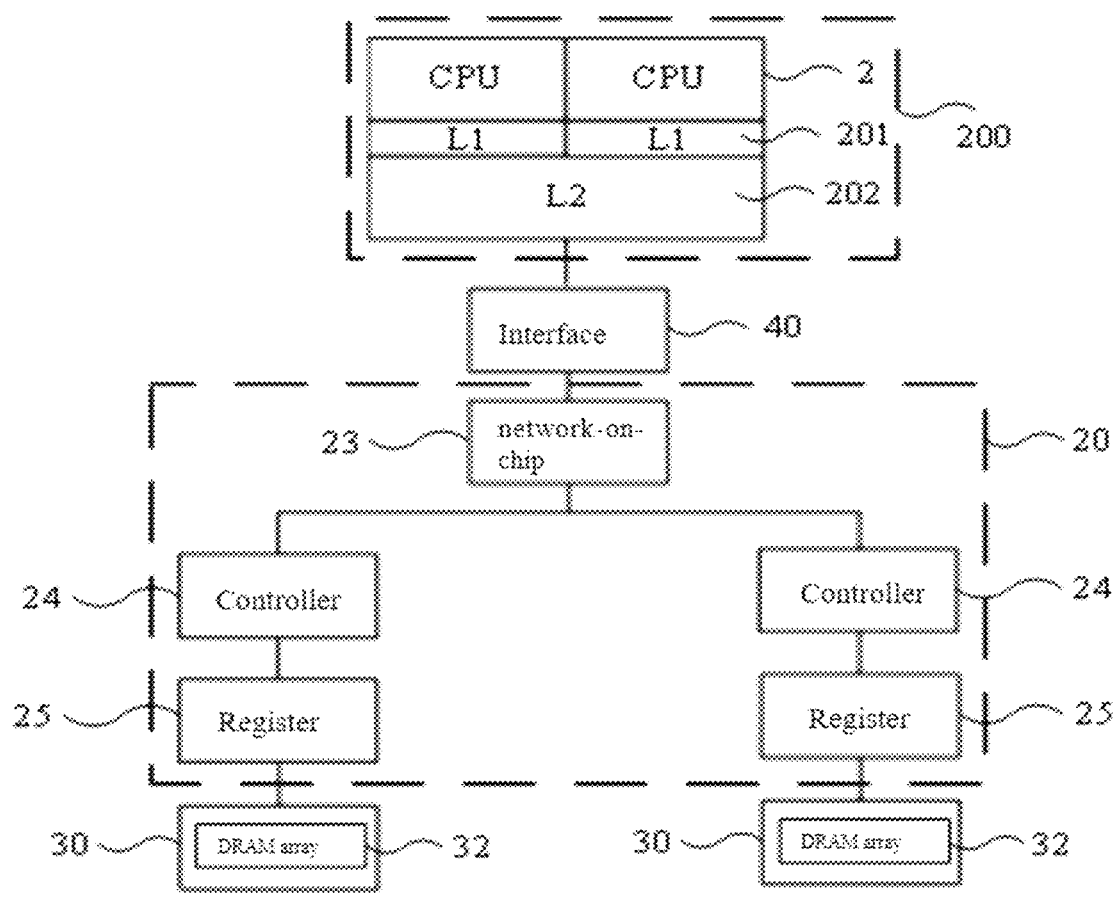
FIG. 4 is a structural schematic view of the interface logic unit according to another embodiment shown in FIG. 1.

In combination with FIG. 1-FIG. 3, as shown in FIG. 4, which is a structural schematic view the interface logic unit shown in FIG. 1 according to another embodiment. As shown in FIG. 4, different from the above-mentioned embodiments, the interface logic unit 20 of the present embodiment includes a plurality of controllers 24 and a plurality of registers 25.

The network-on-chip 23 is connected to the plurality of controllers 24, and each controller 24 is connected to the storage wafer 30 through one register 25.

Optionally, the network on chip 23 includes a plurality of interconnected routers to form a plurality of nodes, each node is connected to one controller 24, and the CPU 2 may access the controller 24 corresponding to the router by accessing an address of the router, so as to perform reading and writing data operation.

In other words, the CPU 2 inputs an address through the interface logic unit 20, and the interface logic unit 20 drives the controller 24 connected to the node corresponding to the address based on the address, such that the CPU 2 performs read and write operations on the storage wafer 30.

In the present embodiment, there may be two CPUs 2, each of the two CPUs is integrated with the L1 level cache 201, and the two CPUs 2 share the L2 level cache 202. The two CPUs 2, the two L1 caches 201 and the shared L2 cache 202 form the processing assembly 200, and the processing assembly 200 is connected to the LLC chip 1 through the interface 40.

The processing assembly 200 may perform read and write operations on the LLC chip 1 through the non-shared independent memory access or the shared memory access.

Specifically, the storage wafer 30 includes at least one storage space, and the two CPUs 2 in the processing assembly 200 respectively correspond to different storage spaces. The processing assembly 200 performs read and write operations on a specific storage space to enable storage access by a specific CPU 2.

When the LLC chip 1 receives reading and writing instructions sent by at least one of the two CPUs 2, at least one of the plurality of CPUs 2 perform read and write operations on the correspondingly arranged DRAM array 32 through the interface logic unit 20. that is, performs read and write operations on a specific storage space.

Optionally, the two CPUs 2 may simultaneously or independently perform read and write operations on the storage wafer 30, that is, realize the non-shared mode cache data of the LLC chip 1.

Optionally, in other embodiments, the LLC chip 1 may also perform data caching in a shared mode. Specifically, any CPU 2 in the processing assemblies 200 may perform read and write operations on any DRAM array 32 in the storage wafer 30 through the network on chip 23, that is, perform read and write operations on any storage space of the storage wafer 30. When the CPU 2 performs read and write operations on the DRAM array 32, the next CPU 2 to be executed needs to wait the current CPU 2 to finish performing the read and write operations before the next CPU 2 may access the target DRAM array 32 to execute the read and write operations, whether or not the next CPU 2 needs to perform read and write operations on the DRAM array 32 currently performed by the CPU or another DRAM array 32.

In the present embodiment, the LLC chip 1 is connected to the plurality of controllers 24 through the network-on-chip 23, and quickly find the target controller 24 through the address corresponding to the controller, thereby realizing large-scale high-speed calculation. At the same time, the LLC chip 1 of the present embodiment performs data caching through the non-shared mode or the shared mode, such that the CPU 2 performs read and write operations on the target DRAM array 32, and improves efficiency of the CPU 2 in accessing data.

Figure 5:
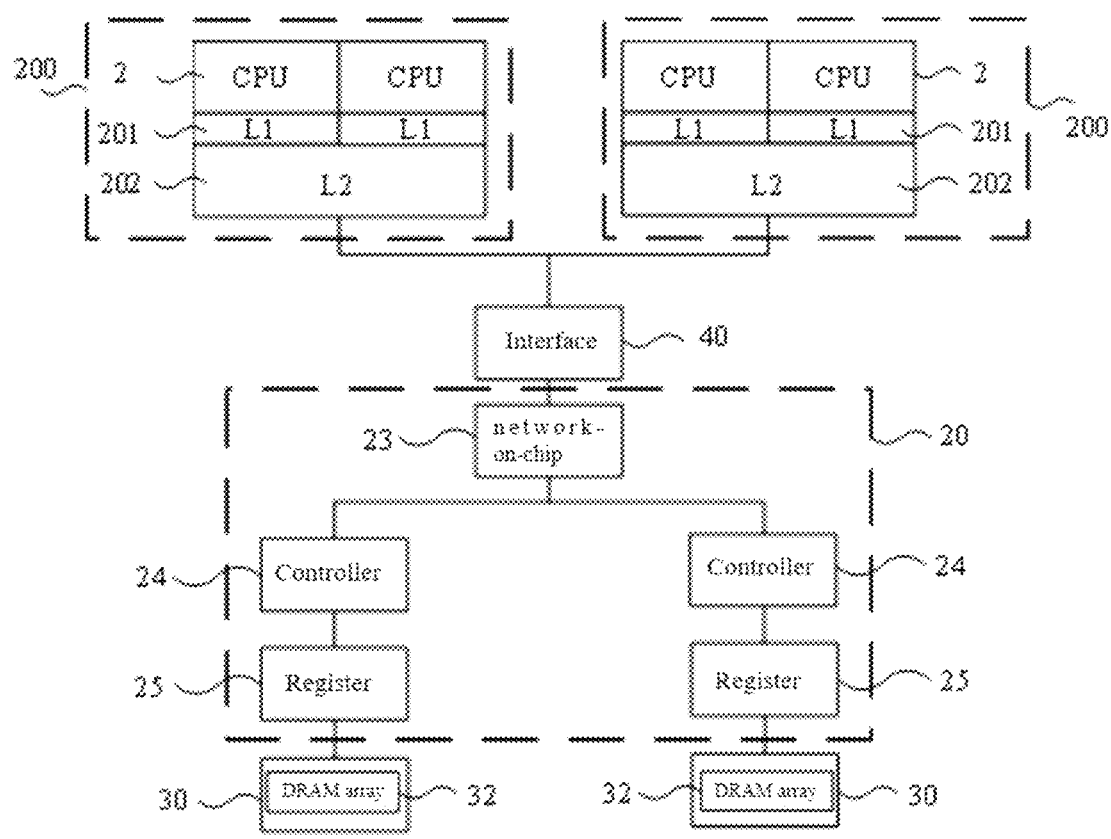
FIG. 5 is a structural schematic view of the LLC chip according to another embodiment of the present disclosure.

In combination with FIG. 1-FIG. 4, as illustrated in FIG. 5, which is a structural schematic view of the LLC chip according to another embodiment of the present disclosure. As shown in FIG. 5, different from the above-mentioned embodiment, the present embodiment may include a plurality of processing assemblies 200, and each processing assembly 200 includes at least two CPUs 2. The at least two CPUs 2 in each processing assembly 200 shares the L2 level cache 202, and the at least two CPUs 2 and the L2 level cache 202 form the processing assembly 200. The plurality of processing assemblies 200 are connected to the LLC chip 1 through the interface 40.

Specifically, an access amount or an access speed of each processing assembly 200 is different, and a required storage space is different, that is, a required number of DRAM arrays 32 is different. Therefore, the plurality of processing assemblies 200 may be connected with different numbers of DRAM arrays 32 according to requirements, and different numbers of DRAM arrays 32 are taken as storage spaces corresponding to the plurality of processing assemblies 200.

Optionally, the DRAM array 32 has a certain number of rows and columns. An individual DRAM array 32 with a preset number of rows and columns may be divided as a DRAM array 32. Different processing assemblies 200 correspond to individual DRAM arrays 32 different numbers of rows and columns.

Alternatively, the number of rows of the DRAM array 32 is divided according to a ratio of storage space requirements of different processing assemblies 200, and each processing assembly 200 includes a DRAM array 32 with a corresponding number of rows.

Alternatively, the number of columns of the DRAM array 32 is divided according to the ratio of storage space requirements of different processing assemblies 200, and each processing assembly 200 includes a DRAM array 32 with a corresponding number of columns.

Optionally, in another embodiment, the processing assembly 200 only includes one CPU 2, one L1 level cache 201 and one L2 level cache 202.

Figure 6:
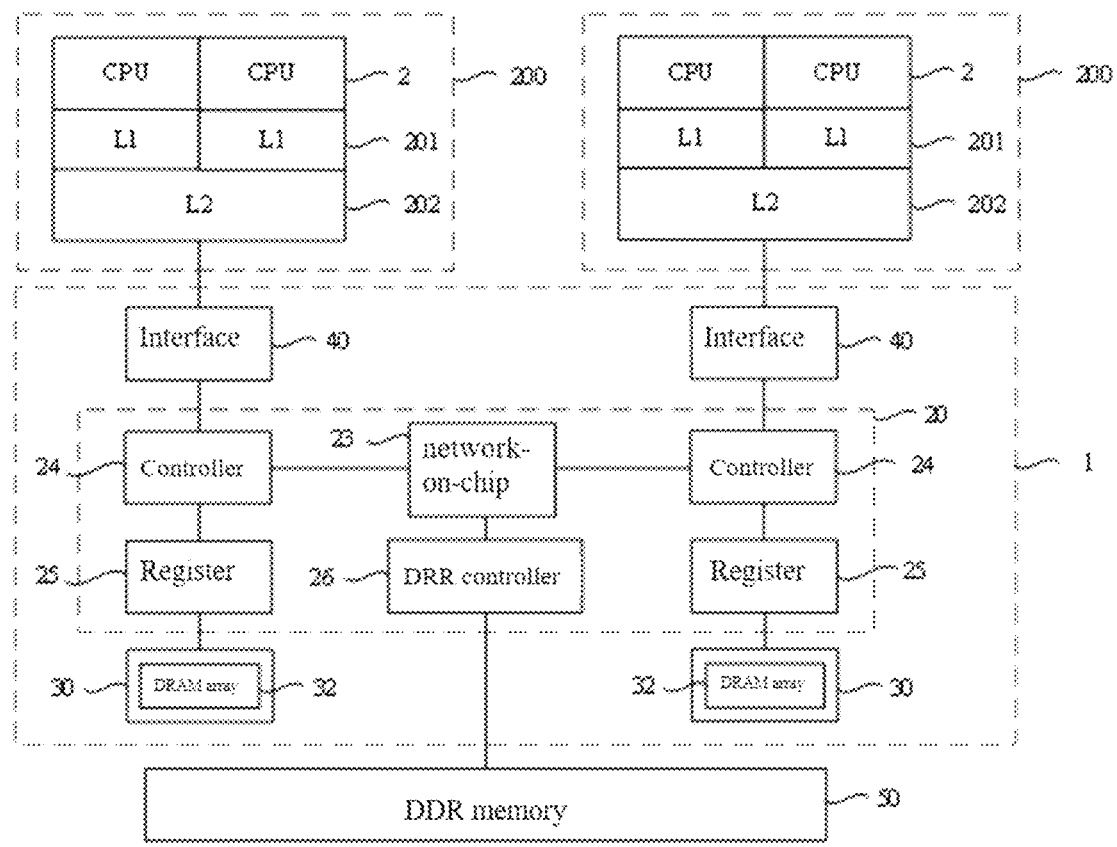
FIG. 6 is a structural schematic view of the LLC chip according to another embodiment of the present disclosure.

In combination with FIG. 1-FIG. 5, as illustrated in FIG. 6, which is a structural schematic view the LLC chip according to another embodiment of the present disclosure. As shown in FIG. 6, different from the above-mentioned embodiment, at least two CPUs 2 share the L2 level cache 202 to form the processing assembly 200, and at least two processing assemblies 200 are respectively connected to the controller 24 and the register 25 of the LLC chip 1 through an independent corresponding interface 40 to perform non-shared independent storage access to the independently corresponding DRAM array 32.

Specifically, the LLC chip 1 includes a plurality of interfaces 40, and each interface 40 corresponds to a DDR storage array access channel. The LLC chip 1 performs non-shared independent storage accesses on the storage array 32 respectively through one independent controller 24 and one independent register 25.

The controller 24 includes a storage access controller (not shown in the drawings) of the DRAM array 32 and a cache coherence protocol controller (not shown in the drawings). The storage access controller is configured to establish storage access to the corresponding DRAM array 32. The cache coherence protocol controller is configured to access the DDR controller 26 through the network-on-chip 23, and then realize performing read and write operations on the DDR memory 50 (main memory).

The cache coherence protocol controllers in the plurality of controllers 24 also communicate with each other by means of the network-on-chip 23, and are configured to realize at least part of data exchange between the processing assemblies 200, so as to overcome the problem of data synchronization among the plurality of CPUs in the non-shared storage structure, and improve the function of the cache coherence protocol.

In the non-shared storage structure, each processing assembly 200 is able to independently realize reading and writing on large-capacity and high-bandwidth LLC storage space, and an independent cache line may be designed for each processing assembly 200 to increase cache exchange efficiency. It is also possible to increase a bit width of a cache line of part or all of the processing assemblies 200 to fully utilize the advantage of the ultra-large bandwidth of the three-dimensionally integrated memory-bonded storage wafer 30.

Optionally, a plurality groups of DDR controllers 26 may be designed to be interconnected with the network-on-chip 23 to form a plurality of DDR channels and control a plurality groups of DDR memories 50 respectively.

Figure 7:
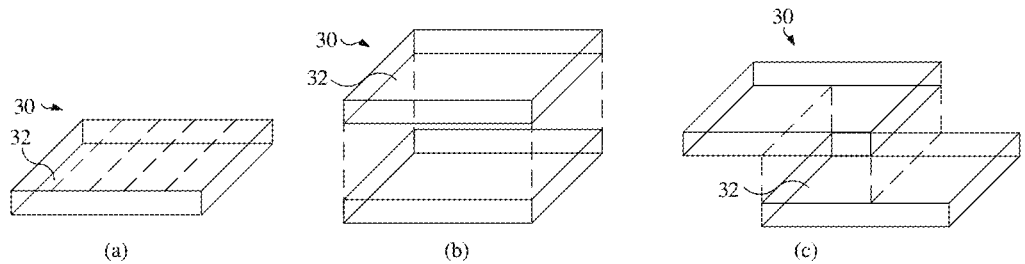
FIG. 7 is a structural schematic view of an arrangement of a DRAM array of the present disclosure.

Optionally, arrangements of the plurality of DRAM arrays 32 is shown in FIG. 7, which is a structural schematic view of arrangements of DRAM arrays according to the present disclosure.

Specifically, as shown in FIG. 7(a), the plurality of DRAM arrays 32 may be distributed in different regions of one same storage wafer 30.

As shown in FIG. 7(b), the plurality of DRAM arrays 32 may also be distributed on the plurality of storage wafers 30, each storage wafer 30 is a storage wafer layer, and the plurality of DRAM arrays 32 are respectively distributed on the plurality of storage wafer layers.

As shown in FIG. 7(c), the plurality of DRAM arrays 32 may also be distributed on the plurality of storage wafers 30. Two storage wafers 30 are taken as an example in the present schematic view. Projections of the two storage wafers 30 on a plane parallel to the storage wafers 30 have a partial overlapping area, and the DRAM arrays 32 are distributed in the partial overlapping area. When there is a plurality of storage wafers 30, projections of different storage wafers 30 have different partial overlapping areas on a plane parallel to the storage wafers 30, and then the plurality of DRAM arrays 32 correspond to different projected partial overlapping area of the storage wafers 30 respectively.

The storage wafer 30 includes the DRAM array 32, and the formed storage capacity (hundreds of megabytes to tens of megabytes) is 2 to 4 orders of magnitude higher than that of the related art (more than ten megabytes), which is enough to provide each group of processing assemblies 200 with independent non-shared LLC storage space. The storage capacity is still much larger than the existing technology, which greatly increases an LLC hit rate and reduces frequency of storage access to the main memory.

The storage wafer 30 includes the DRAM array 32, and the storage wafer 30 is connected to the LLC chip 1 through three-dimensional integrated bonding. The interconnection density is extremely high (1 micron of spacing, millions of connection points per square millimeter), and a very large bus bit width (thousands to hundreds of thousands) is established between the LCC chip 1 and the storage wafer 30, which is 2 to 4 orders of magnitude higher than that of the related art (64 bits). The large bus bit width provides independent non-shared LLC storage access channels for at least part or all of the processing assemblies 200, and the memory access bandwidth is still far greater than that of the related art.

In the non-shared storage structure, each processing assembly 200 may independently realize reading and writing of the large-capacity and high-bandwidth LLC storage space, getting rid of constraints of the bus of the controller 24 in the shared storage LLC structure. There is no need to establish mutual waiting time-sharing access mechanism, not only simplifying design difficulty of the controller 24, but also realizing the concurrent reading and writing of the large-capacity and high-bandwidth LLC storage space by the processing assembly 200, and fully releasing the ultra-large bandwidth advantage of the three-dimensional integrated bonded storage wafer 30.

Figure 8:
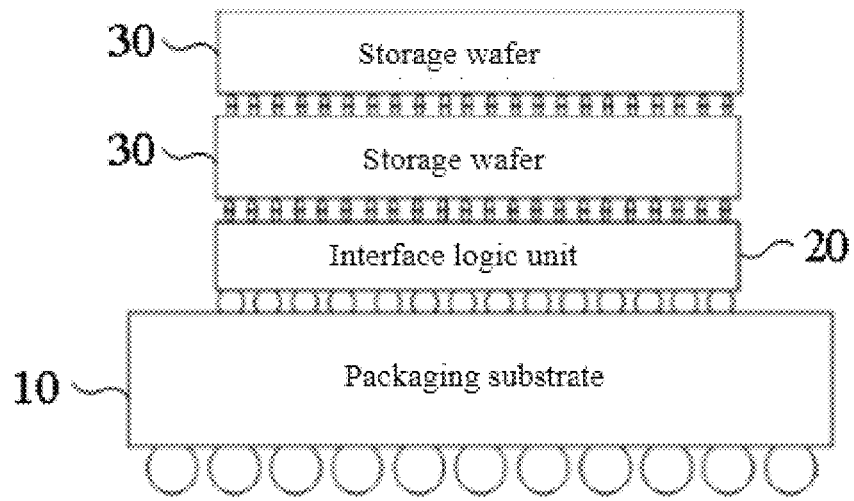
FIG. 8 is a structural schematic view of the LLC chip according to another embodiment of the present disclosure.

In combination with FIG. 1-FIG. 7, as illustrated in FIG. 8, which is a structural schematic view of an LLC chip according to another embodiment of the present disclosure. As shown in FIG. 8, different from the above-mentioned embodiments, the LLC chip 1 includes a plurality of storage wafers 30. Optionally, the number of storage wafers 30 may be 2, 3, 4 and so on.

The plurality of storage wafers 30 are sequentially stacked on the interface logic unit 20, and two adjacent storage wafers 30 in the plurality of storage wafers 30 are connected by bonding.

Optionally, the plurality of storage wafers 30 of the LLC chip 1 in the present embodiment all include the DRAM array 32. In the present embodiment, when the CPU 2 adopts the non-shared mode to cache data, the plurality of CPUs 2 may divide the storage space as required, may use the DRAM array 32 of one single storage wafer 30 as an individual DRAM array 32, and different CPUs 2 correspond to different numbers of individual DRAM arrays 32, that is, different CPUs 2 correspond to different numbers of storage wafers 30.

Optionally, in other embodiments, when the CPU 2 adopts the non-shared mode to cache data, the plurality of CPUs 2 may divide the storage space according to demand. The CPU 2 may adopt a partial overlapping area of projections of different storage wafers 30 in the storage wafer array formed by the plurality of stacked storage wafers as an individual DRAM arrays 32. Different CPUs 2 correspond to DRAM arrays 32 with different capacities. In other words, DRAM arrays 32 with different capacities correspond to partial overlapping areas of projections with different areas.

Optionally, in other embodiments, when the CPU 2 caches data in the shared mode, the plurality of CPUs 2 do not need to divide the storage space, and may directly access the corresponding DRAM array 32 according to the address.

The LLC chip 1 of the present embodiment increases the data capacity of the LLC chip 1 by sequentially stacking the plurality of storage wafers 30, and improves the speed of data access through a connection mode of bonding the plurality of storage wafers 30, thereby realizing large capacity and high bandwidth data cache.

In the present disclosure, the storage wafer 30 and the interface logic unit 20 are three-dimensionally integrated, and the storage wafer 30 and the interface logic unit 20 are connected by the plurality of first bonding columns 31 and the plurality of second bonding columns 22 corresponding to each other, thereby increasing signal transmission bandwidth through the plurality of distributed interfaces.

Secondly, in the present disclosure, the DRAM wafer of volatile memory is used as storage wafer 30, improving the bandwidth and the speed of data access, further improving the speed that CPU 2 performs reading and writing operation on the LLC chip 1. At the same time, the present disclosure implements data caching in the non-shared mode, such that the CPU 2 may perform read and write operations on the target DRAM array 32 to improve data accessing efficiency of the CPU 2.

Thirdly, in the present disclosure, the data capacity of the LLC chip 1 is increased by stacking the plurality of storage wafers 30 in sequence, and the data access rate is improved to achieve large capacity and high bandwidth data cache through the bonding connection mode between the plurality of storage wafers 30.

Figure 9:
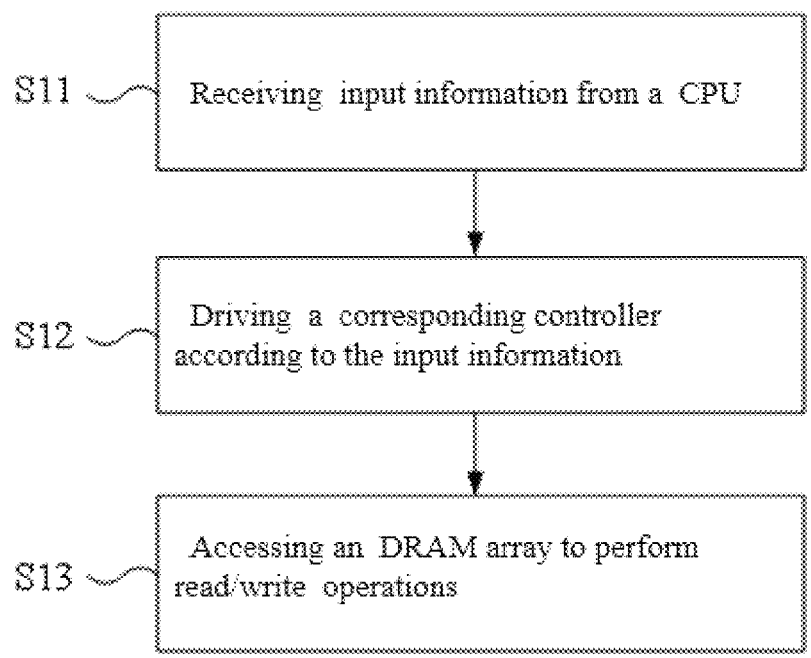
FIG. 9 is a schematic flow chart of read and write operations of the LLC chip according to an embodiment of the present disclosure.

In the present disclosure, a method for read and write operations on an LLC chip is also provided, and a schematic flowchart of the method is shown in FIG. 9. In conjunction with FIG. 1-FIG. 8, as shown in FIG. 9, which is a schematic flow chart of read and write operations on the LLC chip according to the present disclosure. Specifically, the method of performing read and write operations on the LLC chip in the present embodiment to may include the following operations.

Operation S11: receiving input information from a CPU.

The LLC chip 1 receives information input by the CPU 2 through a plurality of lead ports 11. Specifically, the input information includes reading and writing instructions and address information. When the reading and writing instructions is specifically a writing instruction, the input signal also includes data information to be stored.

Operation S12: driving a corresponding controller according to the input information.

The input information is sequentially transmitted to the interface logic unit 20 through the plurality of lead ports 11 of a packaging substrate 10, the packaging substrate 10 and a plurality of bumps 21. The interface logic unit 20 searches for address information in a network-on-chip 23 according to the address information included in the input information. The node corresponding to the address information further drives the controller 24 connected to the node; and the data information in the input information is temporarily stored in a register 25 by the controller 24.

Operation S13: accessing a DRAM array to perform read and write operations.

When a storage space of the register 25 is full, the CPU 2 further accesses the storage wafer 30, and transmits the temporarily stored data through the register 25 to the DRAM array 32 contained in the storage wafer 30 through a port, so as to perform read and write operations.

When the input information includes a read command, the CPU 2 reads the data information stored in the DRAM array 32 corresponding to the CPU 2 through the controller 24 and the register 25, and the data information is pre-stored in the register 25. When the storage space of the register 25 is full, the register 25 further transmits the data information to the CPU 2 through the controller 24 and the network-on-chip 23.

Figure 10:
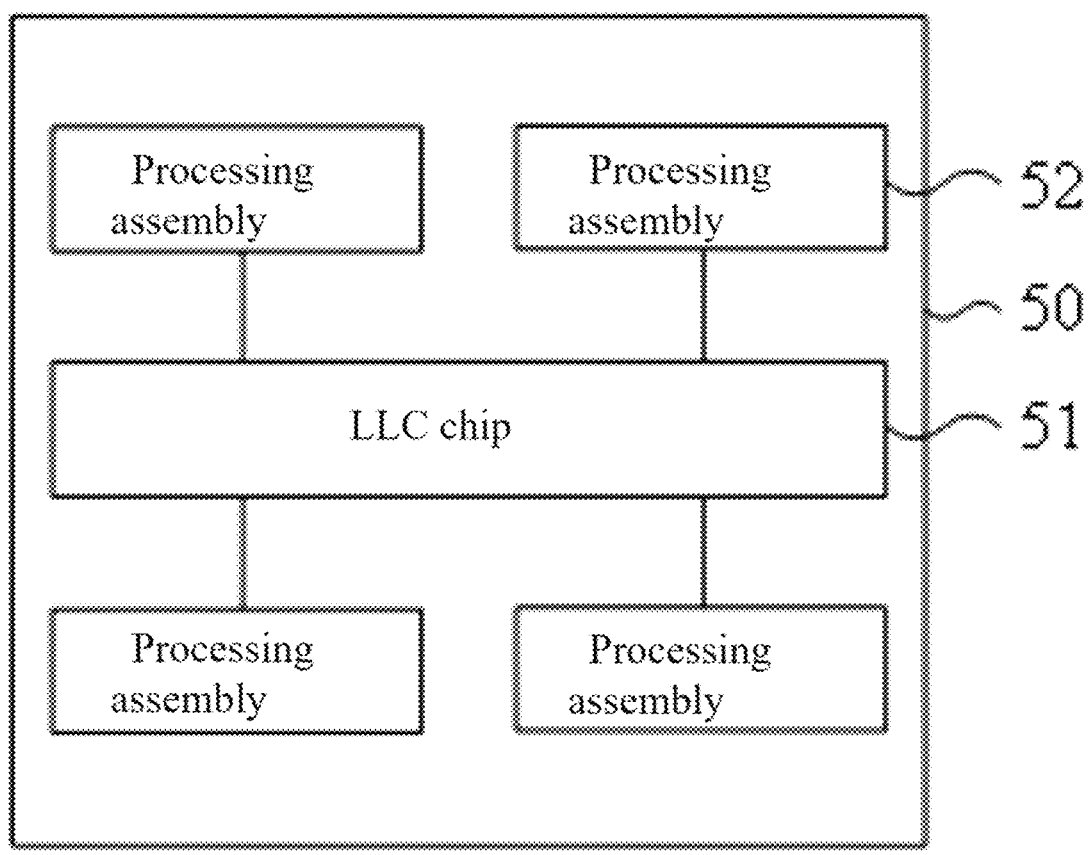
FIG. 10 is a structural schematic view of a caching system of the present disclosure.

The present disclosure also provides a caching system, as shown in FIG. 10, which is a structural schematic view of a caching system according to the present disclosure. As shown in FIG. 10, the cache system 50 includes an LLC chip 51 and a plurality of processing assemblies 52. The LLC chip 51 is the LLC chip 1 disclosed in the above-mentioned embodiments, and the processing assemblies 52 are the processing assemblies 200 disclosed in the above-mentioned embodiments, which will not be repeated here.

The plurality of processing assemblies 52 are respectively connected to the LLC chip 51 to perform read and write operations on the LLC chip 51. Specifically, the plurality of processing assemblies 52 may independently perform read and write operations on the LLC chip 51, or the plurality of processing assemblies 52 simultaneously perform read and write operations on the LLC chip 51, or at least two of the plurality of processing assemblies 52 simultaneously perform read and write operations on the LLC chip 51.

Optionally, the cache system 50 divides the storage space of the storage wafer 30 according to the access volume or access speed of the plurality of processing assemblies 52, such that each processing assembly 52 performs read and write operations on the corresponding storage space. Specific division methods are described as above, and will not be repeated here.

Optionally, in another embodiment, the plurality of processing assemblies 52 are packaged in a same device.

The above are only embodiments of the present disclosure, and are not intended to limit the patent scope of the present disclosure. Any equivalent structure or equivalent process conversion made by using the description of the application and the contents of the accompanying drawings, or directly or indirectly used in other related technical fields, are included in the scope of patent protection of the present disclosure in the same way.

What is claimed is:

1. A last-level cache (LLC) chip, comprising a storage wafer, an interface logic unit and a packaging substrate, wherein the interface logic unit and the storage wafer are arranged on the packaging substrate in sequence, and the storage wafer and the interface logic unit are three-dimensionally integrated and arranged on the packaging substrate to form the LLC chip;

a plurality of processing assemblies is connected to the interface logic unit, so as to perform read and write operations on the storage wafer through the interface logic unit;

the storage wafer comprises at least one storage space, and the plurality of processing assemblies perform read and write operations on a specific one or any one of the storage spaces, so as to realize non-shared independent storage access or shared storage access; wherein the storage space of the storage wafer is divided according to an access amount or an access speed of the plurality of processing assemblies, wherein the interface logic unit comprises a network-on-chip, a controller, and a register;

wherein one end of the network-on-chip is configured to connect an interface, the interface is configured to connect the interface logic unit to the processing assembly, another end of the network-on-chip is connected to one end of the controller, another end of the register is connected to one end of the register, and another end of the register is connected to the storage wafer.

2. The LLC chip according to claim 1, wherein the interface logic unit comprises a plurality of controllers and a plurality of registers;

the network-on-chip is connected to the plurality of controllers, each controller is connected to one corresponding register, and each controller is connected to the storage wafer through the corresponding register.

3. The LLC chip according to claim 2, wherein the network-on-chip comprises a plurality of interconnected routers to form a plurality of nodes, each of the nodes is connected to one controller; wherein the processing assembly accesses the controller connected to the corresponding router through accessing an address of the corresponding router, so as to access a storage array of the storage wafer connected to the controller through the controller, and perform data read and write operations.

4. The LLC chip according to claim 1, wherein the interface logic unit comprises a plurality of independent interfaces, a plurality of independent controllers and a plurality of independent registers, wherein the storage wafer comprises a plurality of independent dynamic random-access memory (DRAM) arrays, and the plurality of independent interfaces, the plurality of independent controllers, and the plurality of independent registers form channels for independently accessing the plurality of DRAM arrays, and the plurality of processing assemblies are respectively connected to the channels through corresponding interfaces, so as to perform non-shared independent storage access on the corresponding DRAM arrays.

5. The LLC chip according to claim 4, wherein the interface logic unit comprises a network-on-chip, wherein the network-on-chip is connected to the plurality of controllers.

6. The LLC chip according to claim 5, wherein the interface logic unit comprises a double data rate (DDR) controller, wherein the DDR controller is connected to the network-on-chip, and the DDR controller is also configured to connect to an DDR memory to perform read and write operations on the DDR memory.

7. The LLC chip according to claim 4, wherein at least one of the plurality of processing assemblies performs read and write operations on the corresponding DRAM array through the channel.

8. The LLC chip according to claim 4, wherein the storage wafer comprises at least one DRAM wafer, wherein the plurality of DRAM arrays is distributed in different regions of one same DRAM wafer; or the plurality of DRAM arrays are distributed on the plurality of storage wafers, and the plurality of DRAM arrays correspond to the plurality of storage wafer layers or overlapping areas of projections of the plurality of storage wafers.

9. The LLC chip according to claim 1, wherein the storage wafer further comprises a plurality of first bonding columns, the interface logic unit further comprises a plurality of second bonding columns and a plurality of bumps, and the packaging substrate comprises a plurality of lead ports,
wherein each of the first bonding columns is connected to a corresponding second bonding column, such that the storage wafer is connected to the interface logic unit, and the interface logic unit is connected to the packaging substrate through the plurality of bumps; the packaging substrate is connected to the plurality of processing assemblies through the plurality of lead ports.

10. The LLC chip according to claim 6, wherein the controller comprises a cache coherence protocol controller, wherein the cache coherence protocol controller accesses the DDR controller through the network-on-chip to realize read and write operations on the DDR memory.

11. The LLC chip according to claim 10, wherein the cache coherence protocol controllers of the plurality of controllers communicate with each other through the network-on-chip.

12. The LLC chip according to claim 1, comprising a plurality of storage wafers, wherein the plurality of storage wafers is sequentially stacked on the interface logic unit, and two adjacent storage wafers in the plurality of the storage wafers are connected by bonding.

13. The LLC chip according to claim 1, further comprising an interface, wherein the interface is connected to the interface logic unit, and the interface is configured to connect to the processing assemblies.

14. A cache system, comprising:
an LLC chip and a plurality of processing assemblies;
wherein each of the processing assemblies comprises at least two central processing units (CPUs), at least two L1 level caches and one L2 level cache, and the plurality of processing assemblies are connected to the LLC chip to perform read and write operations;
the LLC chip comprises a storage wafer, an interface logic unit, and a packaging substrate; wherein the interface logic unit and the storage wafer are sequentially arranged on the packaging substrate, and the storage wafer and the interface logic unit are three-dimensionally integrated and arranged on the packaging substrate to form the LLC chip;
the plurality of processing assemblies are connected to the interface logic unit, so as to perform read and write operations on the storage wafer through the interface logic unit; and
the storage wafer comprises at least one storage space, and the plurality of processing assemblies perform read and write operations on a specific one or any one of the storage spaces, so as to realize non-shared independent storage access or shared storage access; wherein the storage space of the storage wafer is divided according to an access amount or an access speed of the plurality of processing assemblies,
wherein the LLC chip further comprises an interface, wherein the interface is connected to the interface logic unit, and the interface is connected to the processing assemblies,
wherein the interface logic unit comprises a network-on-chip, a controller, and a register;
wherein one end of the network-on-chip is configured to connect the interface, another end of the network-on-chip is connected to one end of the controller, another end of the register is connected to one end of the register, and another end of the register is connected to the storage wafer.

15. The cache system according to claim 14, wherein the cache system comprises a plurality of processing assemblies, wherein each of the processing assemblies comprises at least two CPUs.

16. A method for reading and writing an LLC chip, comprising:
receiving input information from a CPU;
driving a corresponding controller according to the input information; and
accessing a DRAM array for read and write operations;
wherein the LLC chip comprises a storage wafer, an interface logic unit and a packaging substrate, the interface logic unit and the storage wafer are arranged on the packaging substrate in sequence, and the storage wafer and the interface logic unit are three-dimensionally integrated and arranged on the packaging substrate to form the LLC chip;
a plurality of processing assemblies is connected to the interface logic unit, so as to perform read and write operations on the storage wafer through the interface logic unit;
the storage wafer comprises at least one storage space, and the plurality of processing assemblies perform read and write operations on a specific one or any one of the storage spaces, so as to realize non-shared independent storage access or shared storage access; wherein the storage space of the storage wafer is divided according to an access amount or an access speed of the plurality of processing assemblies,
wherein the interface logic unit comprises a network-on-chip, a controller, and a register;
wherein one end of the network-on-chip is configured to connect an interface, the interface is configured to connect the interface logic unit to the processing assembly, another end of the network-on-chip is connected to one end of the controller, another end of the register is connected to one end of the register, and another end of the register is connected to the storage wafer.

17. The method according to claim 16, wherein the interface logic unit comprises a plurality of controllers and a plurality of registers;
the network-on-chip is connected to the plurality of controllers, each controller is connected to one corresponding register, and each controller is connected to the storage wafer through the corresponding register.

\* \* \* \* \*